G. J. CLAUTICE.
SELF HEATING SOLDERING IRON.
APPLICATION FILED JUNE 30, 1913.
1,102,997.
Patented July 7, 1914.
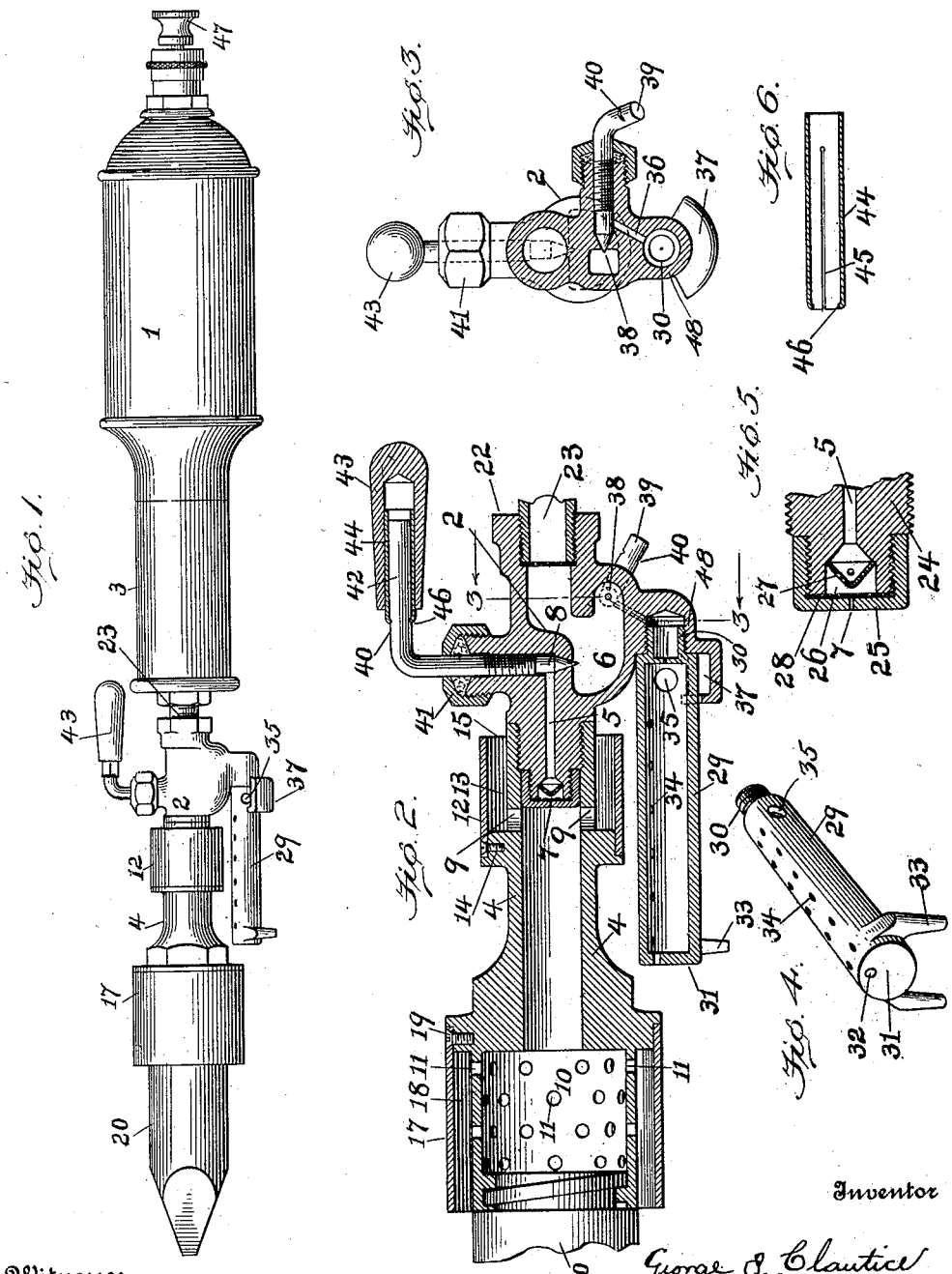
Witnesses
Edwin L. Bradford
G. Ferd. Vogt
Inventor
George J. Clautice
By Mann & Co.
Attorneys

UNITED STATES PATENT OFFICE.

GEORGE J. CLAUTICE, OF BALTIMORE, MARYLAND, ASSIGNOR TO LYON, CONKLIN & COMPANY, OF BALTIMORE, MARYLAND, A CORPORATION OF DELAWARE.

SELF-HEATING SOLDERING-IRON.

1,102,997. Specification of Letters Patent. Patented July 7, 1914.

Application filed June 30, 1913. Serial No. 776,489.

*To all whom it may concern:*

Be it known that I, GEORGE J. CLAUTICE, a citizen of the United States, residing at Baltimore, in the State of Maryland, have invented certain new and useful Improvements in Self-Heating Soldering-Irons, of which the following is a specification.

This invention relates to improvements in soldering irons of that class in which the copper or solder iron point is heated by the flame of gas produced from fluid stored in a chamber attached to the iron.

The present invention comprises several features of improvement that are embodied in one soldering iron structure and which will first be described and then pointed out in the claims. These features are illustrated in the accompanying drawing, in which, Figure 1 is a side view of the improved solder applying tool. Fig. 2 is a longitudinal section of the principal parts of the tool. Fig. 3 is a vertical cross-section on the line 3—3 of Fig. 2. Fig. 4 is a perspective view of the preliminary heater device. Fig. 5 is a section view of the burner head on a larger scale. Fig. 6 is a section view of the split spring bushing of wood handle.

Referring to the drawing the numeral, 1, designates the chamber or reservoir in which the fluid hydro-carbon is carried or stored; the valve-casing, 2, has an internally screw-threaded coupling, 22, with which a pipe, 23, connects to a handle part, 3, that is attached to the said reservoir, 1. A gas-discharge nozzle, 24, is integral with the valve-casing, 2, and a passage, 5, in this nozzle leads from the gas-generating chamber, 6, to the small aperture, 7, that opens into the end of the mixing tube, 4. The gas escapes from the small aperture, 7, into the mixing tube, and the flow of gas is controlled by a needle or cone-pointed valve, 8, whose port communicates with the gas-generating chamber, 6, and the said passage, 5.

The nozzle, 24, has at its discharge end a screw-cap, 25, which takes over the end, and the small gas-escape aperture, 7, is in this cap; the cap partly forms a chamber, 26, in the nozzle and the said passage, 5, terminates in this chamber. A cone-shaped diaphragm, 27, has a closed apex and side perforations and is in the chamber in alinement between the end of gas passage, 5, and the aperture, 7, which latter is so very small that the least particle of matter will obstruct it.

The cone-shaped diaphragm is stiff enough to permanently retain its shape and resist the effects of the high degree of heat, and the perforations allow the hot gas to pass. I have found that wire gauze alone does not practically answer this purpose. The perforated sheet-metal cone-shaped diaphragm prevents small particles of oxid, dirt, or other foreign matter, from passing with the gas and choking or obstructing the small gas-escape aperture, 7, and rendering the soldering iron inoperative, as is so common in this class of device. A flat disk, 28, of very fine wire gauze may be used, however, in contact with the inner circular face of the cap, 25, which face sustains the flimsy gauze; the wire gauze internally covers the small escape aperture, 7. When this flat gauze disk, 28, is burnt or choked by accumulation of particles, its flat shape and location renders it easy to be renewed.

The mixing tube, 4, has at its side adjacent the valve-case, 2, air-inlets, 9, through which the outside atmosphere may enter to the interior of the said tube. When the metal parts of the valve-case, gas-discharge nozzle and mixing tube have been heated so as to generate gas, and the valve, 8, has been turned to open its port, then gas under pressure from the chamber, 6, will issue from the small aperture, 7, into the tube, 4, and the air and gas will mix while passing forward to the relatively large combustion chamber, 10. The circular wall of the combustion chamber has numerous holes, 11, from which will issue flames and hot products of combustion that surround the exterior of said wall. The end of the combustion chamber, 10, directly opposite the end of the mixing tube, 4, is closed by the copper or solder-applying point, 20.

An exterior guard sleeve, 12, surrounds the air-inlets, 9, of the mixing tube and forms an annular space, 13; at one end this space is closed and one or more screws, 14, at such end confine the sleeve; but at the opposite end, 15, the said sleeve and annular space are open—the open end being nearest the valve case, 2. The closed end of the sleeve is near the inlets, 9, and said sleeve covers but does not close the inlets. The atmospheric air enters the open end, 15, of the sleeve and moves forward to the inlets, 9, then passes through said inlets to the interior of the mixing-tube, 4, where the hot gas is present,—the gas that has escaped from the aperture, 7, and finally both air and gas mix while passing along the tube, 4, to the chamber, 10, where combustion takes place and the flames and hot products of combustion will heat the solder-applying point, 20.

When soldering tools of this character are used where there is an exposure to the wind, the heat and flames issuing from the holes, 11, of the combustion chamber instead of heating the solder-applying point, 20, are blown off sidewise and such heat is lost in the atmosphere; to avoid this I provide a directing sleeve, 17, large enough to exteriorly surround the cylindric wall of the combustion chamber, 10, and form an annular space, 18, into which all the holes, 11, open. At the end next to the soldering point, 20, the said annular space is open, but at the other end, nearest the mixing tube, said space is closed; a screw, 19, serves to confine the sleeve and keep it from movement. The operation of this sleeve, 17, is most advantageous in its results of applying the hot products of combustion directly to the "copper" or soldering iron, 20. The heat and flames that issue from the holes, 11, enter the annular space, 18, and then are directed forward onto and completely around the soldering iron, 20, which is thereby well heated; by this device no heat is lost in the atmosphere.

It is desirable in order to start the generation of gas in a self-heating soldering iron, that means should be attached to the iron for preliminarily heating the valve-case, 2, the gas-discharge nozzle, 24, and the tube, 4, wherein air and gas are mixed. I provide a device to accomplish this end, and that will also serve as a supporting foot to hold the tool in a certain definite position when it is temporarily awaiting use.

The improved heater consists of a tube, 29, having at one end a screw-threaded neck, 30, open at its end and smaller in diameter than the body of the tube and having the opposite end, 31, closed but provided with a small outlet, 32, serving for gas to escape to produce a jet-flame; near its closed end this tube is provided with two feet, 33, which serve as supports. The valve-case, 2, below the chamber, 6, has a downward-extending portion provided with a screw-threaded socket, 48, that receives the neck, 30, of the heater tube. This downward portion is provided with a segment-shaped cup, 37, one side of which projects laterally and forward of the said socket, like a bracket, and has its concave edge upward.

When the heater-tube neck, 30, is screwed into the socket, 48, the cylindric exterior surface of the heater tube near its said neck rests on the concave edge of the segment-shaped cup, 37, and the latter serves to brace and sustain the heater tube.

A hole or air-inlet, 35, is in the heater tube directly above the segment cup, 37, and the latter will receive any fluid that may accidentally overflow from said hole.

It will be seen the heater tube, 29, is not only in proper position for heating the desired parts of the soldering iron but its feet, 33, will rest on a work table or other resting place and will sustain the heated tool while it is temporarily awaiting use.

At the outset of preparing to heat this iron the chamber, 6, will contain the hydrocarbon fluid that is to produce the gas; this fluid comes from the reservoir, 1, and finds its way through a pipe, 23, into said chamber, 6. A cross passage, 36, see Figs. 2 and 3, leads from the chamber, 6, to the entrance end, 30, of the said heater tube.

It is unimportant what the precise interior construction of the entrance end of the heater tube may be to permit either fluid or gas to pass from the neck, 30, into the chamber of said heater tube, but a construction is shown in the sectional view Fig. 2, of the drawing that serves this purpose; here the neck, 30, is partly separated from the chamber of the tube by a partition whose center is provided with a small hole or passage, indicated in black; this hole permits the fuel to pass into the chamber of the heater tube.

A valve, 38, has a cone-point end and a screw-thread, and the stem-end of the valve is bent at a right-angle, 39; this stem-end has a notch, 40, on two opposite sides. By turning this valve-stem one way the screw will advance the cone-point and close the outlet port to the cross passage, 36, and cut-off the flow of fluid into the heater tube, 29; by turning the right-angle stem, 39, the reverse way the screw will cause the point to recede and open the said cross-passage. In this way the valve, 38, controls fluid that may pass to the heater tube, 29.

The gas controlling valve, 8, in the case, 2, has a stuffing box, 41, and a point that closes the port leading from gas chamber, 6, to the passage, 5, and the valve is screw-threaded: the stem, 42, of this valve is also bent at right angles to the screw-threaded part, and like the other valve stem has two notches.

The heater tube, 29, will be carried by the iron, and the stems of two valves, 8, and, 38, will project, I have therefore provided that one handle shall serve for both valve-stems. The handle, 43, consists of wood or other non-heat conducting material; this handle has a bore that contains a tube or split spring bushing, 44; the two longitudinal slits, 45, that extend from one end only give to this end an expansion and contractive character. Each split end has at its extremity an inturned catch point, 46, that is adapted to engage with the two notches, 40, on the right-angled end of either valve. The catch points, 46, of the split tube project a little from the wood handle, and said points engage the notches and thus hold on the valve stem.

When heating the iron parts the handle 43 will be used on the stem, 39; when the parts have had their preliminary heating, the handle, 43, may be pulled off this valve-stem and stuck on the valve-stem, 42.

In the operation of this device, the reservoir, 1, contains gasolene or other gas-producing fluid, and the pump, 47, is to be used to produce an air-pressure that will maintain a supply of fluid through the tube, 23, to the chamber, 6. The valve, 8, closes against such pressure and when closed no pressure exists on the valve-stem and its packing in the stuffing box, 41, and consequently there will be no leakage at this box of gas or fluid when the soldering iron is not being used. This advantage is also secured by the structure of the second valve, 38.

When about to use the iron, the wood handle, 43, should be slipped on to the valve-stem, 39, and fluid allowed to flow into the heater tube, 29. This fluid is then lighted by using a match and very soon the valve-case, 2, gas-discharge nozzle, 24, and mixing tube, 4, will be hot enough to generate gas. Then the handle, 43, will be transferred from valve-stem, 39, to the valve-stem, 42, of the other valve, 8. Upon opening valve, 8, the gas will escape from aperture, 7, and may be lighted at the open end of space, 18.

Having thus described my invention what I claim and desire to secure by Letters Patent is:—

1. The combination in a self-heated soldering iron of a valve-case having in its lowermost part a screw-threaded socket; a gas-discharge nozzle; an air-and-gas mixing tube one end of which covers the said nozzle; and a heater tube parallel with and below the said nozzle and mixing tube and provided along its length with jet-flame holes and having an open screw-neck which is coupled into said screw-threaded socket.

2. The combination in a self-heated soldering iron of an air and gas mixing tube, 4; a gas-discharge nozzle connected with one end of said tube; a valve-case connected to said gas-discharge nozzle and provided at its lower part with a socket that opens at the side—said three parts being in horizontal alinement; a horizontal heater-tube below the said three parts and having a screw threaded neck, 30, coupling into said socket and said tube provided with feet, 33.

3. The combination in a self-heated soldering iron of an air-and-gas mixing tube; a gas-discharge nozzle; a valve-case having a downward extending portion provided at its side with a socket-opening, 48; a heater tube having one end entered into said socket-opening and the body of the tube extending horizontally, and a segment-shaped cup having one of its sides attached to said downward portion of the valve-case and the other side of the cup projecting laterally and forward of said socket with its concave edge upward and contacting with the heater tube and serving to brace and sustain the latter.

4. The combination in a self-heated soldering iron of an air-and-gas mixing tube; a gas-discharge nozzle; a heater tube to preliminarily heat said parts; a valve-case provided with a gas-passage leading to the gas-discharge nozzle, and a fluid-passage leading to the heater tube; a valve in said case to control the flow of gas, and a second valve in the same case to control the flow of the liquid; and a tubular-shaped handle of non-heat conducting material to engage the stems of either of said valves and open or close same.

In testimony whereof I affix my signature in presence of two witnesses.

GEORGE J. CLAUTICE.

Witnesses:
G. FERD. VOGT,
LOUIS C. KLERLEIN.

---

Copies of this patent may be obtained for five cents each, by addressing the "Commissioner of Patents, Washington, D. C."